US012554980B2

(12) United States Patent
Tang et al.

(10) Patent No.: US 12,554,980 B2
(45) Date of Patent: Feb. 17, 2026

(54) ESTIMATING REMAINING USEFUL LIFE BASED ON OPERATION AND DEGRADATION CHARACTERISTICS

(71) Applicant: International Business Machines Corporation, Armonk, NY (US)

(72) Inventors: Shengrong Tang, Dublin, OH (US); Jonathan Tristan O'Gorman, Whitegate (IE); Amaresh Rajasekharan, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1053 days.

(21) Appl. No.: 17/190,607

(22) Filed: Mar. 3, 2021

(65) Prior Publication Data
US 2022/0284278 A1 Sep. 8, 2022

(51) Int. Cl.
*G06N 3/08* (2023.01)
*G06N 3/04* (2023.01)
*G06N 3/044* (2023.01)
*G06N 3/0442* (2023.01)
*G06N 3/09* (2023.01)
*G06N 3/096* (2023.01)
*G06N 3/0985* (2023.01)

(52) U.S. Cl.
CPC ............. *G06N 3/08* (2013.01); *G06N 3/04* (2013.01)

(58) Field of Classification Search
CPC .................................. G06N 3/08; G06N 3/04
See application file for complete search history.

(56) References Cited

U.S. PATENT DOCUMENTS

| 8,712,726 | B2 | 4/2014 | Li |
| 8,781,982 | B1 | 7/2014 | Das |
| 9,002,775 | B1 | 4/2015 | Harrison |
| 11,783,194 | B1 * | 10/2023 | Wu ............... G06N 3/086 |
| | | | 706/25 |

(Continued)

FOREIGN PATENT DOCUMENTS

| CN | 110163389 A | 8/2019 |
| CN | 110188934 A | 8/2019 |
| JP | 5881814 B2 | 3/2016 |

OTHER PUBLICATIONS

Zhang et al., "Transfer Learning with Deep Recurrent Neural Networks for Remaining Useful Life Estimation", Nov. 28, 2018, Applied Sciences 8(12), 2416 (Year: 2018).*

(Continued)

*Primary Examiner* — Kamran Afshar
*Assistant Examiner* — Steven Phung
(74) *Attorney, Agent, or Firm* — Yee & Associates, P.C.

(57) ABSTRACT

Methods, computer program products, and/or systems are provided that perform the following operations: obtaining asset data; determining an asset class associated with the asset data; initializing a new neural network model, wherein the new neural network model is initialized based on a pretrained model associated with the asset class; training the new neural network model based, at least in part, on the asset data to obtain a trained remaining useful life model; and deploying the trained remaining useful life model to generate prediction data for one or more assets as output of the trained remaining useful life model.

17 Claims, 6 Drawing Sheets

(56) References Cited

U.S. PATENT DOCUMENTS

| | | | |
|---|---|---|---|
| 2007/0088550 A1* | 4/2007 | Filev | G05B 23/0221 |
| | | | 704/245 |
| 2012/0283963 A1 | 11/2012 | Mitchell | |
| 2014/0365264 A1* | 12/2014 | Smiley | G05B 23/0221 |
| | | | 705/7.25 |
| 2015/0081193 A1 | 3/2015 | Gordon | |
| 2015/0198492 A1 | 7/2015 | Dion | |
| 2015/0262060 A1* | 9/2015 | Husain | G06N 3/08 |
| | | | 706/21 |
| 2018/0005151 A1* | 1/2018 | Liao | G05B 23/024 |
| 2019/0057307 A1 | 2/2019 | Zheng | |
| 2019/0235484 A1 | 8/2019 | Ristovski | |
| 2019/0307427 A1* | 10/2019 | Levy | A61B 8/54 |
| 2019/0311258 A1* | 10/2019 | Zhang | G06N 3/08 |
| 2019/0391574 A1 | 12/2019 | Cheng | |
| 2020/0104677 A1* | 4/2020 | Rae | G06N 3/084 |
| 2020/0104730 A1 | 4/2020 | Strong | |
| 2020/0240875 A1* | 7/2020 | Venkateswaran | G01M 99/005 |
| 2020/0311300 A1* | 10/2020 | Callcut | G06F 30/20 |
| 2020/0372305 A1* | 11/2020 | Streeter | G06F 17/11 |
| 2021/0073660 A1* | 3/2021 | Zhang | G06N 5/04 |
| 2021/0182717 A1* | 6/2021 | Goebel | G06Q 10/20 |

OTHER PUBLICATIONS

Peng et al., "A Remaining Useful Life Prognosis of Turbofan Engine Using Temporal and Spatial Feature Fusion", Jan. 8, 2021, Sensors 2021, 21, 418. https://doi.org/10.3390/s21020418 (Year: 2021).*

"IBM Maximo Application Suite 8.1 expands portfolio to include IBM Maximo Health 8.0 and IBM Maximo Predict 8.0, improving asset lifecycle management feature set", IBM United States Software Announcement 220-286, dated Jul. 28, 2020, 19 pages, Grace Period Disclosure Document.

Babu et al., "Deep Convolutional Neural Network Based Regression Approach for Estimation of Remaining Useful Life", Conference: International Conference on Database Systems for Advanced Applications, Mar. 2016, DOI: 10.1007/978-3-319-32025-0_14, 19 pages.

Ellefsen et al., "Remaining useful life predictions for turbofan engine degradation using semi-supervised deep architecture", Reliability Engineering and System Safety 183 (2019), pp. 240-251.

Li et al., "Remaining Useful Life Estimation in Prognostics Using Deep Convolution Neural Networks", Reliability Engineering & System Safety, 172, Publication Date Apr. 1, 2018, DOI 10.1016/j.ress.2017.11.021, 29 pages, https://escholarship.org/uc/item/5ns8r3fs>.

Wang et al., "A Remaining Useful Life Prediction Model Based on Hybrid Long-Short Sequences for Engines", 2018 21st International Conference on Intelligent Transportation Systems (ITSC), Maui, Hawaii, USA, Nov. 4-7, 2018, pp. 1757-1762.

Yuan et al., "Fault diagnosis and remaining useful life estimation of aero engine using LSTM neural network", 2016 IEEE/CSAA International Conference on Aircraft Utility Systems (AUS), Oct. 10-12, 2016, Beijing, China, 6 pages.

Zheng et al., "Long Short-Term Memory Network for Remaining Useful Life Estimation", 2017 IEEE International Conference on Prognostics and Health Management (ICPHM), 8 pages.

* cited by examiner

GRAPH 1: EXAMPLE OF RUL PREDICTION

GRAPH 2: PREDICTION ERROR FOR EACH RUL INTERVAL

ESTIMATING REMAINING USEFUL LIFE BASED ON OPERATION AND DEGRADATION CHARACTERISTICS

STATEMENT ON PRIOR DISCLOSURES BY AN INVENTOR

The following disclosure(s) are submitted under 35 U.S.C. § 102(b)(1)(A):

(1) IBM, "IBM Maximo Application Suite 8.1 expands portfolio to include IBM Maximo Health 8.0 and IBM Maximo Predict 8.0, improving asset lifecycle management feature set", IBM United States Software Announcement 220-286, dated Jul. 28, 2020, 19 pages.

BACKGROUND

The present invention relates generally to the field of machine learning, and more particularly to providing for the use of neural networks to predict the remaining useful life of assets.

SUMMARY

According to an aspect of the present invention, there is a method, computer program product and/or system that performs the following operations (not necessarily in the following order): obtaining asset data; determining an asset class associated with the asset data; initializing a new neural network model, wherein the new neural network model is initialized based on a pretrained model associated with the asset class; training the new neural network model based, at least in part, on the asset data to obtain a trained remaining useful life model; and deploying the trained remaining useful life model to generate prediction data for one or more assets as output of the trained remaining useful life model.

DETAILED DESCRIPTION

Figure 1:
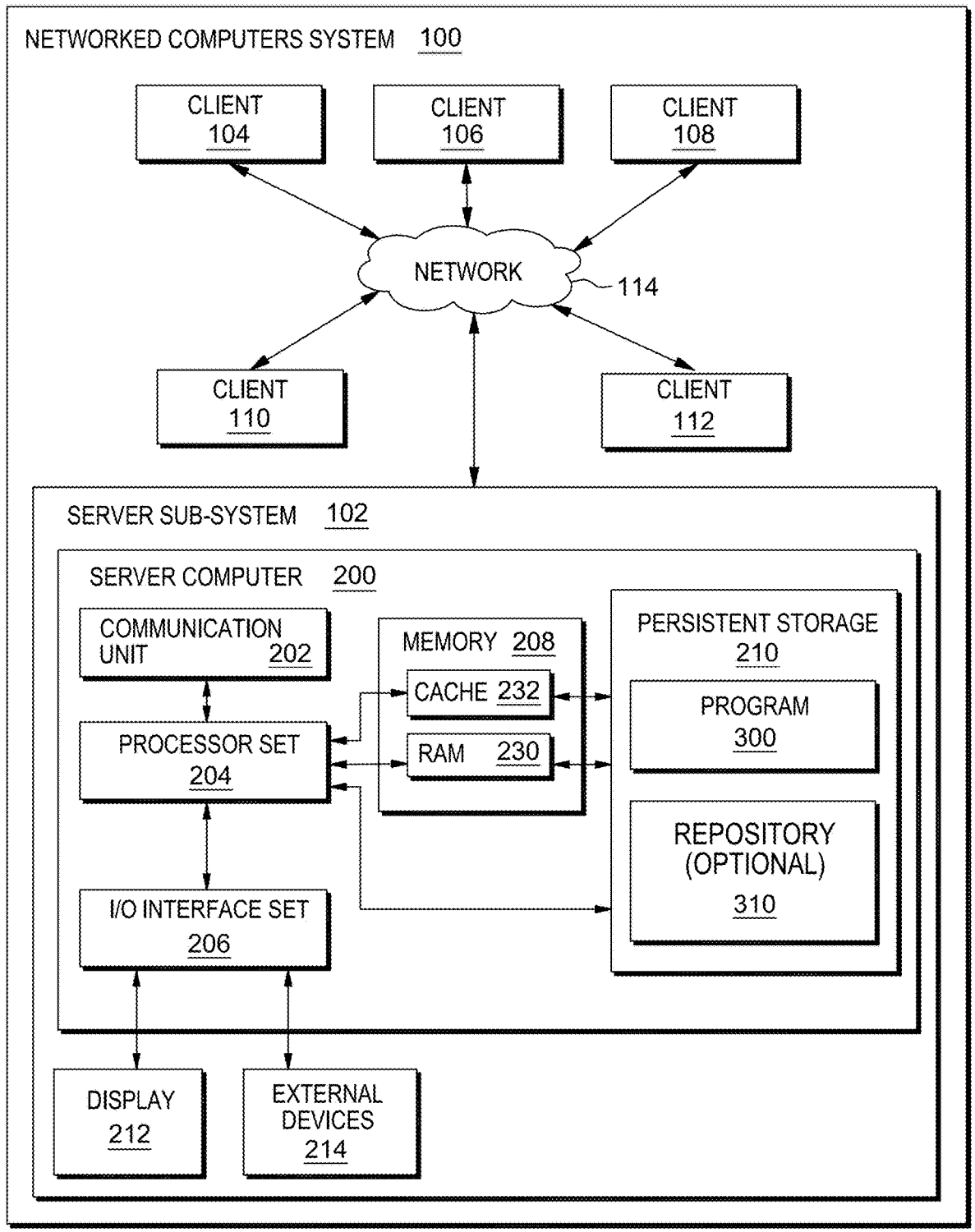
FIG. 1 depicts a block diagram view of a first embodiment of a system, according to the present invention.

According to aspects of the present disclosure, systems and methods can be provided to predict and/or estimate remaining useful life for an asset. In particular, systems and methods of the present disclosure can provide for using an embedded neural network, such as a Long Short-Term Memory (LSTM) neural network, to predict remaining useful life of an asset. The systems and methods of the present disclosure can provide for using pretrained models (e.g., neural network, LSTM models, etc.) associated with asset classes to initialize the weights and layers of the neural network, such that learning from an original asset class (e.g., of a pretrained model) can be applied to a new model (e.g., neural network, LSTM model, etc.) for a related asset class that is to be trained to provide remaining useful life predictions. In some embodiments, systems and methods of the present disclosure can provide for obtaining time series data, for example, associated with a set of assets to be analyzed, and preprocessing the time series data to better represent asset degradation as input to the neural network. In some embodiments, the systems and methods of the present disclosure can provide for a scoring function that can be used, for example, to weight hyperparameters for the neural network (e.g., LSTM model, etc.). In some embodiments, a scoring function can penalize over-estimation of remaining useful for assets.

In general, remaining useful life (RUL) estimation/prediction for assets can play a crucial role in managing the assets, for example, in Prognostics and Health Management (PHM). Several different ways have been proposed to estimate the remaining life of production critical assets. As an example, some estimation techniques may work based on history of similar assets and the lifespan of such assets. Some of estimation methods do not fully utilize data such as sensor readings, cycle level observations, process level configurations, and/or operational events of importance (collectively called covariates or features) when it comes to estimating the lifespan/remaining useful life of the assets. Calculating remaining useful life is often not as simple as subtracting the time factor from the lifespan. For example, many things may affect the remaining useful life such as operating conditions, upgrades, fixes, maintenance, overhaul, and/or the like, for example. Also, assets that have a relatively shorter lifespan (e.g., 5 years or so, etc.) and that can be renewed with overhaul or the like, generally should be studied using the actual variables that determine the remaining useful life of the asset.

However, it may often be difficult to apply many predictive maintenance methods to determine remaining useful life for assets (e.g., critical assets, etc.), even when having large amounts of sensor data. Some reasons for such difficulty can be a lack of skilled data scientists to build bespoke models, a lack of information about the failure characteristics of those assets because of lack of asset domain expertise or the expense of creating an expert system, and/or the like. In addition, there is not always an ability to intuitively measure the usefulness and performance of trained models for their asset classes and business domains, especially for high risk assets for whom end of life can have severe consequences.

Currently, organizations often must create their own predictive maintenance models manually, train such models, and deploy the models so that they can be used in production. Generally, each asset class or asset group can require creating new models from scratch. Such a process can be expensive and time-consuming. In many cases, it may take significant time to train and deploy the models. In addition, many solutions do not distinguish between the importance of various assets, such as assets that organizations cannot risk failing.

Accordingly, systems and methods of the present disclosure can provide for predicting remaining useful life of an asset, for example, using an embedded neural network such as a long short-term memory neural network. Some embodiments can provide for using an embedded neural network (e.g., long short-term memory neural network, etc.) which has had instances pretrained on time series sensor data (e.g., Internet of Things (IoT) sensor data, etc.) for a set of asset classes, such that the learning from the original class can be applied to a related class. In some embodiments, such transfer learning from related asset classes can allow for initializing the weights and layers of the neural network thereby making training, optimizing, and deploying predictive maintenance models much faster. In some embodiments, the neural network can require minimal feature engineering, and thus does not require asset domain experts to determine the optimal predictive features. In some embodiments, systems and methods of the present disclosure can provide for processing the asset time series data (e.g., IoT data, etc.) in terms of chronological cycles and duration of operation to better represent asset degradation as input into the neural network for use in determining remaining useful life. In some embodiments, systems and methods of the present disclosure can provide for a two-dimensional approach to data processing, as opposed to a three-dimensional approach for example, such that training time is reduced. In some embodiments, disclosed systems and methods can provide a novel scoring function that can penalize over-estimation of remaining useful life for assets (e.g., critical assets, etc.) such that asset uptime can be optimized over minor gains in remaining useful life prediction accuracy. In addition, some embodiments can provide for optimizing models for greater accuracy near end of life such that the most critical work can be scheduled well in advance, for example, via integration with an enterprise asset management (EAM) system and/or the like. In some embodiments, systems and methods of the present disclosure can assist in optimizing remaining useful life predictions towards the end of life of the asset, when the most critical decisions are often to be made.

This Detailed Description section is divided into the following sub-sections: The Hardware and Software Environment; Example Embodiments; Further Comments and/or Embodiments; and Definitions.

The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; program 300; and, optionally in some embodiments, a model repository 310.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that can be used to create, manage, and control certain software functions, such as will be discussed in detail, below, in the Example Embodiment sub-section of this Detailed Description section. As an example, a program 300 can provide for obtaining data associated with one or more assets, asset classes, and/or the like, (e.g., asset data, etc.) which can include time series data for set(s) of assets being analyzed, preprocessing such asset data (e.g., for use with a model, etc.), and tuning a scoring function (e.g., for use in training/generating a model, etc.). Program 300 can provide for instantiating a neural network, neural network model, and/or the like, such as a long short-term memory (LSTM) neural network as one example, for design and training. Program 300 can provide for initializing a model (e.g., neural network model, LSTM neural network model, etc.), for example, based, at least in part, on a selected pretrained model. Program 300 can provide for training a model (e.g., neural network model, LSTM neural network model, etc.), including tuning parameters, and/or the like. Program 300 can provide for generating, obtaining, and/or deploying a trained model (e.g., neural network model, LSTM neural network model, etc.) that can be used in generating remaining useful life prediction data for one or more assets. Further, in some embodiments, program 300 can provide for using a trained model (e.g., neural network model, LSTM neural network model, etc.) to generate remaining useful life prediction data for one or more assets, for example, based on asset operation, degradation characteristics, and/or the like, and provide remaining useful life prediction data to assist in managing one or more assets. In some embodiments, a model repository, exchange, marketplace, and/or the like, such as model repository 310, may be included as part of, associated with, and/or accessible by sub-system 102, program 300, and/or the like. A model repository, exchange, market, and/or the like, such as model repository 310, can include substantive data associated with a plurality of pretrained models (e.g., neural network models, etc.) and one or more of such pretrained models may be accessed and/or loaded, for example by program 300, to enable transfer learning in the training of model(s) (e.g., neural network models, long short-term memory neural network models, etc.) to generate predictions and/or other data associated with remaining useful life for one or more assets. In some embodiments, pretrained models (e.g., associated with asset classes, etc.) can be used to initialize weights and early layers of a neural network (e.g., LSTM neural network, etc.) to reduce time required to train, optimize, and deploy models.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). For example, program 300 may include machine readable and performable instructions to provide for performance of method operations as disclosed herein. In this particular embodiment, persistent storage 210 includes a magnetic hard disk drive. To name some possible variations, persistent storage 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor, a smart phone/tablet display screen, and/or the like.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

EXAMPLE EMBODIMENTS

Figure 2:
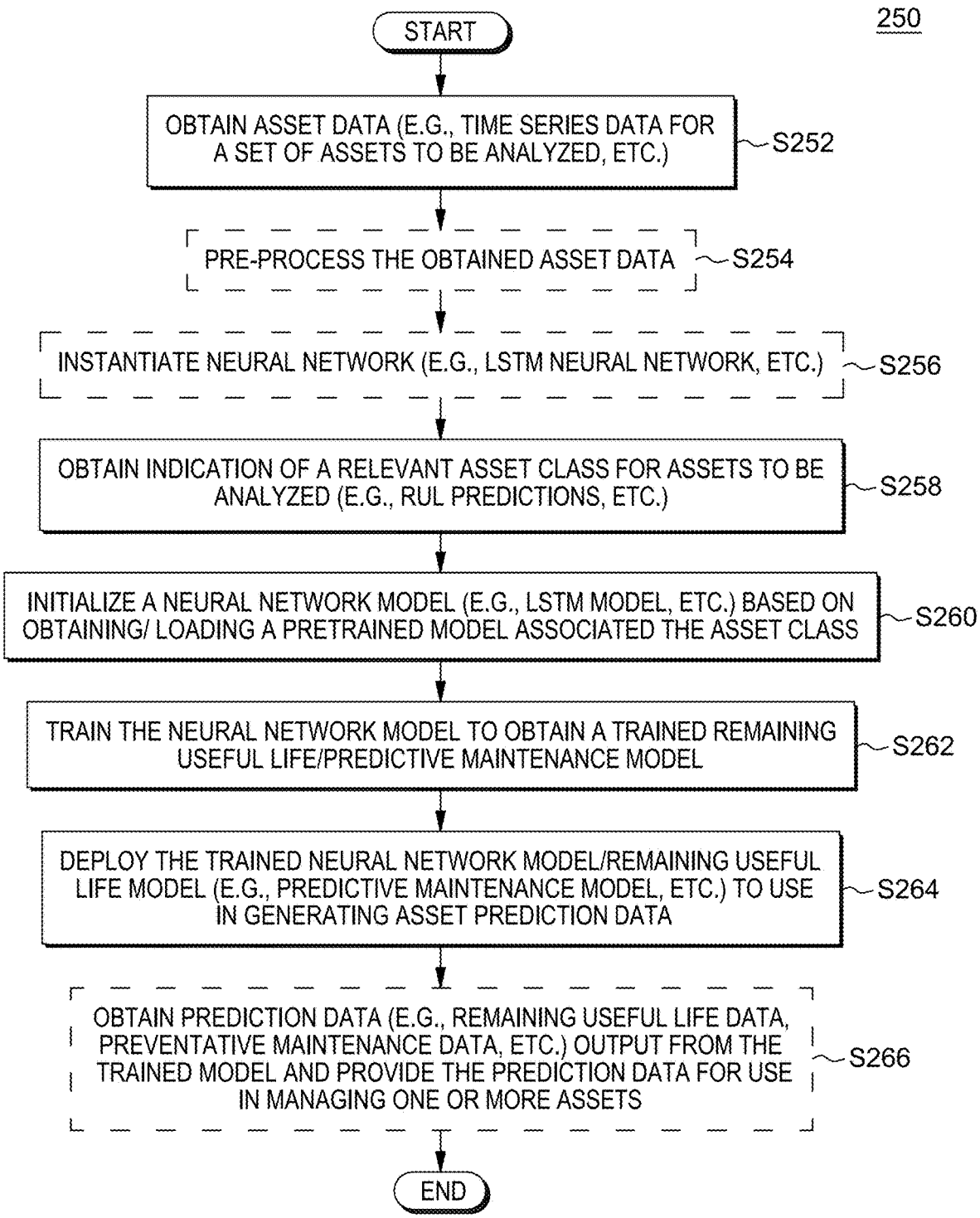
FIG. 2 depicts a flowchart showing a first embodiment method performed, at least in part, by the first embodiment system.
Figure 3:
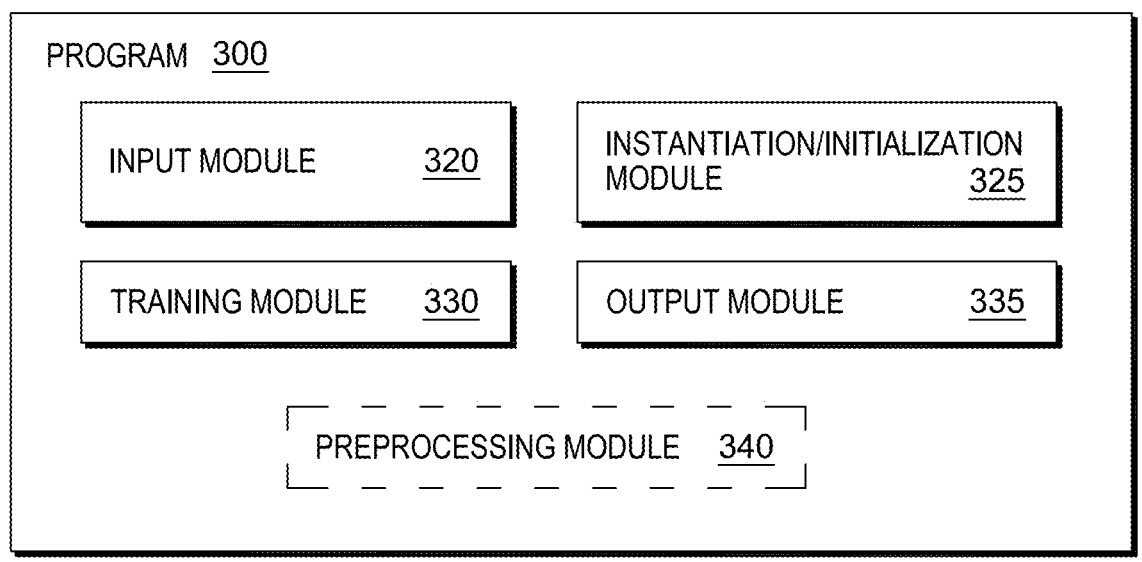
FIG. 3 depicts a block diagram showing an example machine logic (for example, software) portion of the first embodiment system.

FIG. 2 shows flowchart 250 depicting a computer-implemented method, according to embodiment(s) of the present invention. FIG. 3 shows a program 300 for performing at least some of the method operations of flowchart 250. Regarding FIG. 2 and FIG. 3, one or more flowchart blocks or module blocks may be identified with dashed lines and represent optional steps or optional modules that may additionally be included, but which are not necessarily required, in the depicted embodiments. This method and associated software will now be discussed, over the course of the following paragraphs, with extensive reference to FIG. 2 (for the method operation blocks) and FIG. 3 (for the software blocks).

As illustrated in FIG. 2, in some embodiments, operations for estimating remaining useful life for asset(s) begin at operation S252, where a computing system (e.g., server computer 200 of FIG. 1 or the like) obtains asset data. In some embodiments, the asset data includes time series data associated with a set of assets (e.g., equipment, machines, systems, etc.) to be analyzed. For example, in some embodiments, asset data may include data collected or obtained from assets (e.g., equipment, machines, systems, etc.), controllers, meters, sensors (e.g., Internet of Things (IoT) sensors, asset operation sensors, etc.), actuators, systems, data acquisition units, and/or the like associated with one or more assets. In some embodiments, the asset data includes time series data associated with a set of assets (e.g., equipment, machines, systems, etc.) to be analyzed. In some embodiments, for example, the asset data may include IoT time series sensor data from one or more assets (e.g., set of assets, etc.). In some embodiments, the asset data can include, but is not limited to, one or more types of data such as sensor measurements, cycle observations, operational event data, age of asset, operating conditions, maintenance data, and/or the like.

As an example, an input module 320 of FIG. 3 and/or the like can provide for receiving data (e.g., from controllers, meters, assets, sensors, actuators, etc.) associated with a set of assets (e.g., equipment, machines, systems, etc.) to be analyzed and/or managed. In some embodiments, an input module 320 of FIG. 3 and/or the like can include, be associated with, and/or communicate with a data acquisition system to obtain asset data (e.g., from assets, controllers, meters, sensors, actuators, etc.).

In some embodiments, processing can optionally proceed to operation S254, where the computing system (e.g., server computer 200 of FIG. 1 or the like) can provide for preprocessing the obtained asset data, for example, to prepare the asset data (e.g., time series data, sensor data, event data, etc.) to assist in training models (e.g., neural network models, long short-term memory (LSTM) (neural network) models, etc.) to generate predictions of remaining useful life for assets and/or using trained models in generating predictions of remaining useful life for one or more assets. As an example, in some embodiments, a program 300 may include a preprocessing module 340 of FIG. 3 and/or the like. In some embodiments, a preprocessing module 340 and/or the like can, optionally, provide for preprocessing asset data, for example, to better represent asset degradation, and/or the like, such that the data can be used with (e.g., input into) one or more models (e.g., neural network models, LSTM models, etc.) to predict/estimate remaining useful life of assets. In some embodiments, as an example, the computing system can provide for performing a plurality of preprocessing operations on obtained asset data (e.g., prior to use with a model, etc.).

In some embodiments, the preprocessing can include decomposing time series data (e.g., associated with an asset, component, etc.) in terms of chronological cycle and duration. For example, in some embodiments, preprocessing may provide for realizing the operation of a complex assembly in terms of cycles and duration of operation. Additionally, data representative of the age of the asset can be obtained. The age of the asset can be defined in a one or more ways, for example, from date of commission, date of last overhaul date of last maintenance, date of last upgrade, and/or the like. In some embodiments, data representative of the age of the asset may be used to provide a factor representing asset degradation in a model. For example, the longer an asset is in use, the faster the asset may degrade. This factor can serve as a feature indicating the degradation rate.

The preprocessing can include capturing (obtaining) pertinent features (e.g., pertinent to remaining useful life prediction, etc.). Such pertinent features can be captured/obtained based on sensor-based measurements, key operation events, operating conditions, lab testing/calculations, and/or the like. In some embodiments, features can be extracted using summary statistics, events of interest, and/or the like. The preprocessing can include obtaining a selection of one or more features that are pertinent from the captured features, for example using variance threshold, kernel densities, box plots, and/or the like. The preprocessing can include scaling the selected features, for example, by normalizing, standardizing, and/or the like. The preprocessing can include transforming the feature set (e.g., the selected, scaled features, etc.) to a two-dimension tensor.

In some embodiments, after the asset data has been preprocessed and prepared, a novel scoring function can be tuned. In some embodiments, for example, the scoring function can be based on the criticality of the remaining useful life prediction, the priority of the asset, and/or the like. In some embodiments, the scoring function can penalize over-estimation of remaining useful life for assets (e.g., critical assets, production assets, etc.), for example, such that asset uptime can be optimized over minor gains in remaining useful life prediction accuracy.

As an example, in some embodiments, an LSTM scoring function can be provided by:

$$S = \begin{cases} \sum_{i=1}^{n}\left(e^{\frac{-d_i}{13*w(R_i, p_i)}} - 1\right) & \text{if } d_i < 0 \\ \sum_{i=1}^{n}\left(e^{\frac{d_i}{10*w(R_i, P_i)}} - 1\right) & \text{if } d_i \geq 0 \end{cases},$$

Where n is a total number of samples in the test set, RULE is the true remaining useful life (RUL) for the test sample i, and $di = RUL_{(est, i)} - RUL_i$ is the prediction error. In addition, $w(R_i, p_i)$ is the weight function with respect to the true RUL and asset priority.

The above equation has a higher penalty when the model over-estimates the RUL (e.g., 10 vs 13 in denominator) because delayed maintenance will result in the failure of the asset. The weight function $w(R_i, p_i)$ is designed such that an increased penalty is given for lower RUL time frames and higher priority assets. Examples of the weight functions are given below.

In a first example, the weight can be derived as a function of RUL with $w \in [0.5, 1]$.

$$w(R_i) = 0.5 + \frac{R_i}{260},$$

where the true RUL range is $R_i \in [RUL_{min}, RUL_{max}]$. Typically, the true RUL range is determined from the distribution of the RUL variable in the training data set. For example, in a range of [0, 130], when $R_i=0$ the weight is 0.5 (e.g., max penalty), and when $R_i=130$ the weight becomes 1 (e.g., no penalty).

In a second example, the weight can be derived as a function of asset priority $w \in [0.5, 1]$.

$$w(p_i) = 0.5 + \frac{p_i - 1}{8}.$$

In this example, it is assumed that the assets are divided into five categories in terms of priority (1,2,3,4,5) with category 1 being the most important assets. However, any ordinal categorization can be used. The weight function gives most penalty to category 1 and no penalty to category 5 (least important assets).

In a third example, the weight can be derived as a function of RUL and asset priority with $w \in [0.5, 1]$. In this example, it is assumed that the assets are divided into five categories in terms of priority (1, 2, 3, 4, 5). Category 1 assets with RUL=0 receive the most penalty. Category 5 assets with RUL=130(max) receive no penalty.

$$w(R_i, p_i) = 0.5 + \alpha * \frac{R_i}{260} + \beta * \frac{p_i - 1}{8}, \text{ where } \alpha, \beta \in [0, 1] \text{ and } \alpha + \beta = 1.$$

It should be noted, if prediction criticality (e.g., second term) and asset priority (e.g., third term) are equally important, both coefficients $\alpha$ and $\beta$ can be set to 0.5. If the prediction criticality is more important, the coefficient $\alpha$ can be increased, for example, to 0.7, and the coefficient $\beta$ can be decreased, for example, to 0.3. However, it should be noted that the coefficients $\alpha$ and $\beta$ must add up to 1. It should be recognized that the first example and the second example are, in fact, special cases of the third example. Also, it should be recognized that it can be easy to add additional factors as part of the weight function.

In some embodiments, processing can optionally proceed to operation S256, where the computing system (e.g., server computer 200 of FIG. 1 or the like) can instantiate a neural network (e.g., LSTM neural network, model, etc.) for design and training. As an example, an instantiation/initialization module 325 of FIG. 3 and/or the like can provide for instantiating a neural network that can be used in training and providing of model(s) (e.g., neural network model, LSTM model, etc.) for prediction/estimation of remaining useful life of an asset and/or generating and providing remaining useful life prediction data for one or more assets (e.g., via trained model(s), etc.).

Processing proceeds to operation S258, where the computing system (e.g., server computer 200 of FIG. 1 or the like) can obtain an indication of an asset class associated with and/or representative of the obtained asset data, for example, an asset class relevant to the set of assets to be analyzed (e.g., for remaining useful life predictions, etc.). For example, in some embodiments, assets may be associated with different asset classes, such as pumps; heating, venting, and air conditioning (HVAC); conveyor systems; engines; and/or other asset classes. In some embodiments, identification of an asset class (e.g., for the assets to be analyzed) can allow for the use of pretrained model(s) associated with an asset class to initialize a new model (e.g., neural network, LSTM model, etc.), such that learning from an original class can be applied to a related class. As an example, an input module 320 of FIG. 3 and/or the like can provide for obtaining an indication of an asset class, for example, representative of an asset class selection made by a user and/or the like. In some embodiments, an input module 320 and/or the like can provide data associated with the indication of an asset class to obtain and/or load a pretrained model for that class, for example, providing the data associated with the indication of an asset class to an instantiation/initialization module 325 and/or the like.

In some embodiments, the computing system may include and/or be otherwise associated/connected to a model repository, exchange, predictive maintenance model market, digital twin exchange, and/or the like, such as model repository 310 of FIG. 1, and/or the like. The model repository, exchange, market, digital twin exchange, and/or the like (e.g., model repository 310, etc.) can include a plurality of pretrained models, with each pretrained model being associated with an asset class. In some embodiments, the pretrained models may be trained on time series data (e.g., IoT time series sensor data, etc.) for a set of asset classes, such that learning for the original class (e.g., pretrained model, etc.) can be applied to a related class (e.g., for the neural network model to be trained, etc.). For example, the pretrained models can enable transfer learning from related asset classes to initialize the weights and early layers of a neural network (e.g., LSTM model, etc.). The computing system may access and/or otherwise communicate (e.g., via instantiation/initialization module 325 and/or the like) with the model repository, exchange, market, digital twin exchange, and/or the like (e.g., model repository 310, etc.) to obtain/load a pretrained model based on the indicated asset class. As an example, if the assets for which a model is being trained are pumps, a pretrained pump model would be obtained/loaded and used to initialize the weights and layers of a new LSTM model (e.g., to provide predictions of remaining useful life for the pump assets, etc.).

Processing proceeds to operation S260, where the computing system (e.g., server computer 200 of FIG. 1 or the like) can initialize a neural network model, wherein the neural network model is initialized based on a pretrained model associated with the asset class. For example, in some embodiments, the computing system (e.g., server computer 200 or the like) can obtain and/or load a pretrained model (e.g., via a model repository, etc.) based on the indicated/selected asset class. The computing system can initialize the weights and early layers of a neural network (e.g., LSTM model, etc.) based on the obtained/loaded pretrained model (e.g., pretrained model associated with the indicated asset class, etc.). As an example, an instantiation/initialization module 325 of FIG. 3 and/or the like can provide for obtaining and/or loading a pretrained model for the indicated asset class and use the pretrained model in initializing the weights and layers for the neural network (e.g., LSTM model, etc.).

Processing proceeds to operation S262, where the computing system (e.g., server computer 200 of FIG. 1 or the like) can train the neural network model based, at least in part, on the asset data (e.g., time series data, preprocessed data, etc.) to obtain a trained remaining useful life model (e.g., predictive maintenance model, etc.). As an example, a training module 330 and/or the like can provide for training the model (e.g., neural network, LSTM model, etc.) based on training data that can include obtained asset data (e.g., time series data, IoT sensor data, etc.), preprocessed data, and/or the like. For example, training the model (e.g., neural network, LSTM model, etc.) may include determining appropriate weights for the neural connections of the model (e.g., neural network, LSTM model, etc.).

In some embodiments, training the neural network model (e.g., neural network, LSTM model, etc.) can include tuning hyperparameters associated with the model (e.g., neural network, LSTM model, etc.). For example, in some embodiments, a genetic algorithm can be applied to the model (e.g., neural network, LSTM model, etc.) to tune the hyperparameters. In some embodiments, the hyperparameters can be weighted based on a novel scoring function, such as discussed herein. The hyperparameter tuning may be with the goal of optimizing an error metric, such as, for example, a root means square error (RMSE). In some embodiments, a novel error metric (e.g., error estimator, etc.) may be provided to measure the prediction error, for example at a critical period. For example, the error metric may provide for measuring the prediction error for a defined critical period such as a period when remaining useful life less than a specified amount of time (e.g., less than twenty days, thirty days, etc.).

In some embodiments, a remaining useful life (RUL) error metric may be provided for use in training the model (s). For example, traditionally prediction error is measured with root mean square error (RMSE) as follows:

$$RMSE = \sqrt{\frac{1}{n}\sum_{i=1}^{n}d_i^2}$$

where n is a total number of samples in the test set, $RUL_i$ is the true RUL for the test sample i, RUL(est, i) is the predicted RUL for the test sample i, and $d_i$=RUL(est, i)−$RUL_i$ is the prediction error.

Figure 6:
FIG. 6 depicts a graph of example remaining useful life predictions, according to embodiments of the present invention.

Generally, this error metric does a good job in evaluating overall error of the predictions. However, it does not take into consideration the criticality of the predictions. In FIG. 6, Graph 1 shows typical RUL predictions for an engine, where the x-axis is the cycle number and the y-axis is the RUL. As cycle goes higher, RUL goes toward 0. The prediction close to RUL 0 (e.g., bottom-right corner) is more important because it may be the time for a reliability engineer or the like to take action or make a decision (e.g., repair, replace) for the asset. A good model should make $d_i$ smaller when RUL tends to 0.

Figure 7:
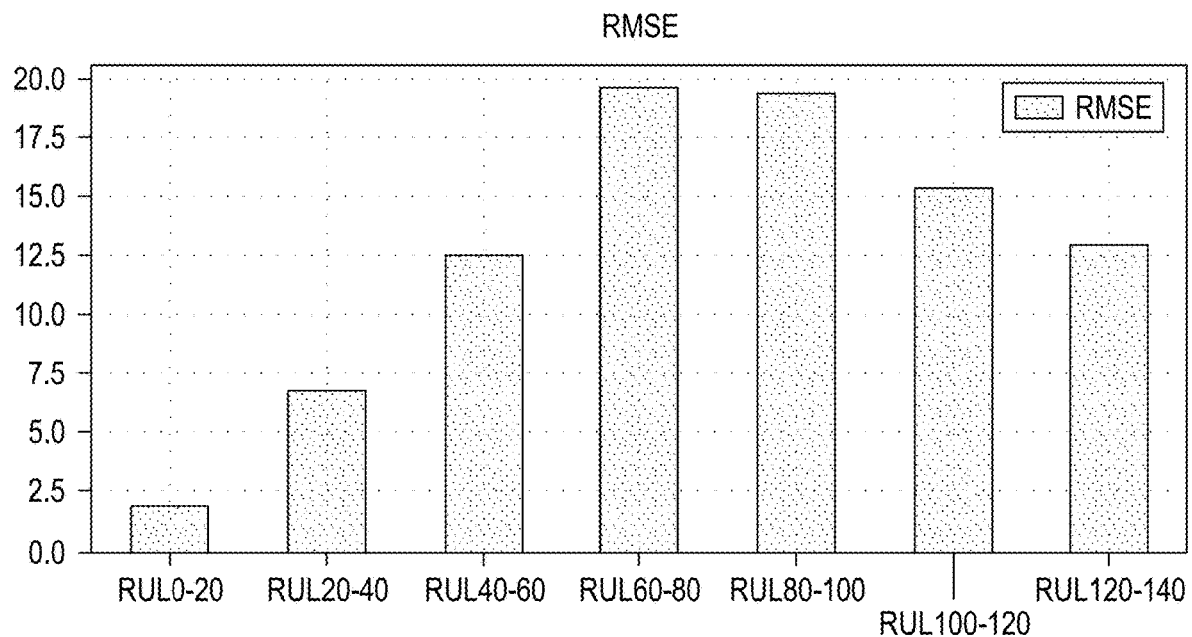
FIG. 7 depicts a graph of example remaining useful life prediction error, according to embodiments of the present invention.

In some embodiments, new error metrics can be provided that break down an overall RMSE into several intervals. As an example, new error metrics intervals may be provided as follows. This example assumes that $RUL_{max}=130$.

$$RUL_{0,20} = \sqrt{\frac{1}{n_1}\sum_{i=1}^{n_1} d_i^2} \quad \text{if } 0 \le RUL_i < 20$$

$$RUL_{20,40} = \sqrt{\frac{1}{n_2}\sum_{i=1}^{n_2} d_i^2} \quad \text{if } 20 \le RUL_i < 40$$

$$RUL_{40,60} = \sqrt{\frac{1}{n_3}\sum_{i=1}^{n_3} d_i^2} \quad \text{if } 40 \le RUL_i < 60$$

$$RUL_{60,80} = \sqrt{\frac{1}{n_4}\sum_{i=1}^{n_4} d_i^2} \quad \text{if } 60 \le RUL_i < 80$$

$$RUL_{80,100} = \sqrt{\frac{1}{n_5}\sum_{i=1}^{n_5} d_i^2} \quad \text{if } 80 \le RUL_i < 100$$

$$RUL_{100,120} = \sqrt{\frac{1}{n_6}\sum_{i=1}^{n_6} d_i^2} \quad \text{if } 100 \le RUL_i < 120$$

$$RUL_{120,140} = \sqrt{\frac{1}{n_7}\sum_{i=1}^{7} d_i^2} \quad \text{if } 120 \le RUL_i < 140$$

where $n_1$ is a total number of samples with $RUL_i$ in [0, 20), $n_2$ is a total number of samples in [20, 40), $n_3$ is a total number of samples in [40, 60), $n_4$ is a total number of samples in [60, 80), $n_5$ is a total number of samples in [80, 100), $n_6$ is a total number of samples in [100, 120), $n_7$ is a total number of samples in [120, 140), and $n_1+n_2+n_3+n_4+n_5+n_6+n_7=n$ is the total number of samples. In FIG. 7, Graph 2 illustrates sample prediction error according to the example.

A determination of which prediction interval is the most important can be made, for example, by a reliability engineer or the like. Generally, the lowest interval [0, 20) or the second lowest interval [20, 40) would be determined to be the most important prediction interval. The model should produce an optimal error estimate for that interval.

In some embodiments, training the model (e.g., neural network, LSTM model, etc.) can include determining whether the scoring function and the error metric of a current training iteration are satisfactory. For example, the computing system may determine whether a scoring function and error metric for a current iteration of a potential trained model meet defined criteria and/or conditions. If the scoring function and error metric for the current iteration of the potential trained model are satisfactory, the computing system can provide the trained remaining useful life model (e.g., predictive maintenance model, etc.) as output of the model training. The output trained remaining useful life model (e.g., predictive maintenance model, etc.) can be used in determining estimation/prediction of remaining useful life for one or more assets.

Processing proceeds to operation to operation S264, where the computing system (e.g., server computer 200 of FIG. 1 or the like) can deploy (e.g., put in production, etc.) the trained remaining useful life model (e.g., predictive maintenance model, etc.) for use in generating prediction data for one or more assets as output of the trained remaining useful life model. As an example, an output module 335 and/or the like can obtain the trained remaining useful life model (e.g., predictive maintenance model, etc.), for example, from training module 330 and/or the like. An output module 335 and/or the like can provide the trained remaining useful life model (e.g., predictive maintenance model, etc.) to be deployed in production. Once deployed, the trained remaining useful life model (e.g., predictive maintenance model, etc.) generate and provide asset predication data (e.g., remaining useful life, etc.) as output that can be used in managing one or more assets.

Optionally, processing can proceed to operation S266, where the computing system (e.g., server computer 200 of FIG. 1 or the like) may obtain remaining useful life prediction data (e.g., prediction data, preventative maintenance data, etc.) for one or more assets output from the trained remaining useful life model (e.g., predictive maintenance model, etc.). In some embodiments, the computing system may provide the remaining useful life prediction data (e.g., prediction data, preventative maintenance data, etc.) to assist in managing the one or more assets. For example, in some embodiments, the prediction data (e.g., remaining useful life prediction data, preventative maintenance data, etc.) can be provided to a management system, such as an enterprise asset management (EAM) system and/or the like. In some embodiments, the output prediction data from a deployed trained model can be used in the generation of work orders, preventative maintenance schedules, and/or the like. As an example, a rule may be defined such that a remaining useful life less than a defined amount of time (e.g., 20 days, 30 days, etc.) can trigger the generation of a work order, preventative maintenance schedule, and/or the like.

FURTHER COMMENTS AND/OR EMBODIMENTS

Figure 4:
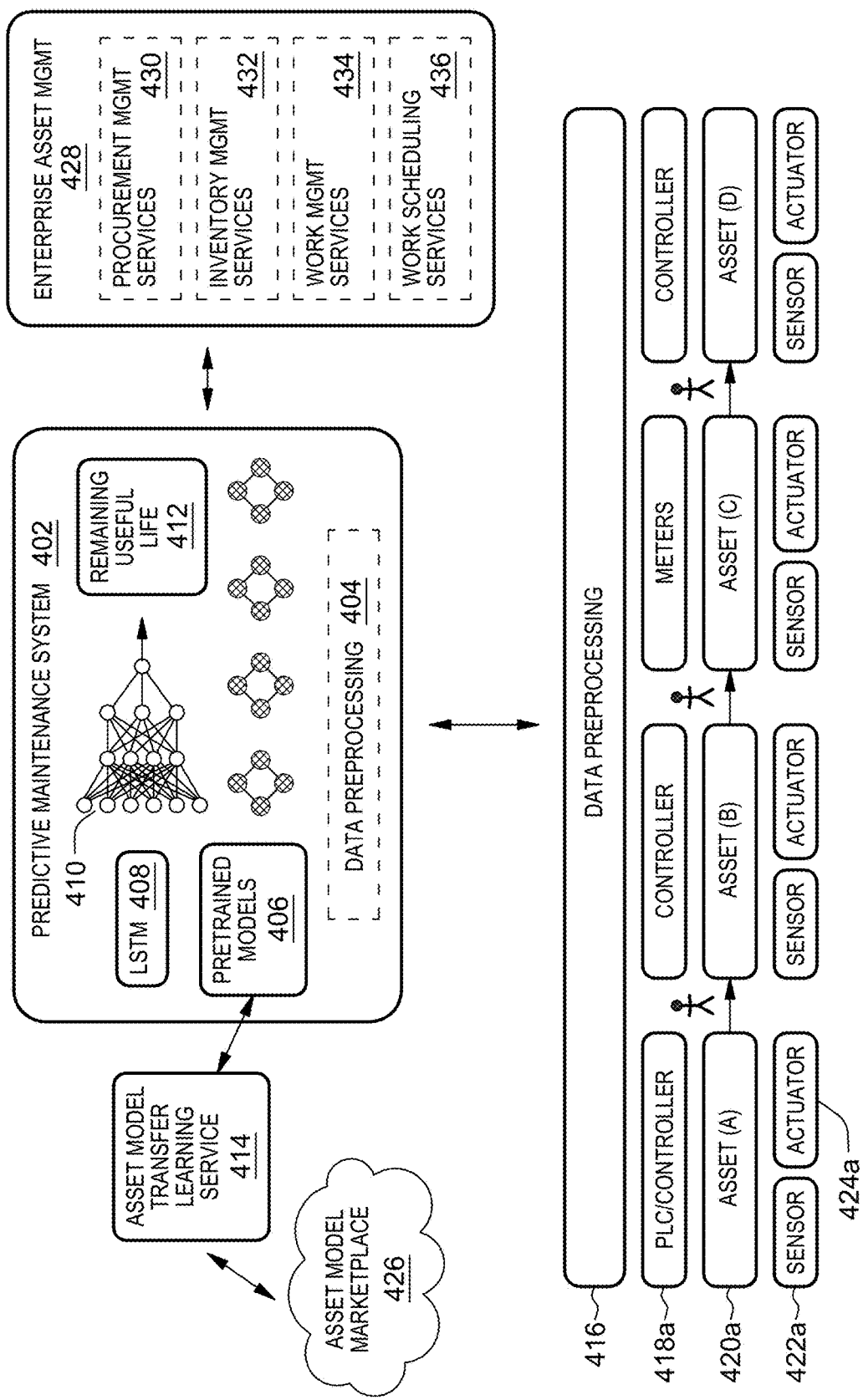
FIG. 4 depicts a block diagram of an example architecture for generating and using remaining useful life predictions for assets, according to embodiments of the present invention.

FIG. 4 depicts a block diagram of an example architecture 400 for generating and using remaining useful life predictions for assets, according to embodiments of the present invention. As illustrated in FIG. 4, in some embodiments, an example architecture for generating and using remaining useful life predictions for assets can include a predictive maintenance system 402, a transfer learning service 414, an asset model marketplace 426, data acquisition 416, a plurality of controllers and/or meters such as controller 418a, a plurality of assets such as asset 420a, a plurality of sensors such as sensor 422a, a plurality of actuators such as actuator 424a, and enterprise asset management 428. As described herein, in some embodiments, predictive maintenance system 402 can obtain asset data (e.g., time series data, IoT time series sensor data, etc.) to be used in analysis of one or more assets. In some embodiments, data acquisition 416 can obtain (e.g., collect, capture, acquire, etc.) relevant data and provide the data to the predictive maintenance system 402. For example, data acquisition 416 can obtain data from a plurality of controllers and/or meters such as controller 418a, a plurality of assets such as asset 420a, a plurality of sensors such as sensor 422a, a plurality of actuators such as actuator 424a, and/or the like.

In some embodiments, predictive maintenance system 402 can include data preprocessing 404 which can provide for preprocessing obtained asset data (e.g., time series data, IoT time series sensor data, etc.) that is to be provided as input to a model (e.g., neural network LSTM model, etc.), for example, to decompose the time series data into chronological cycles and duration of operation, to better represent asset degradation as input into a model, and/or the like.

An indication/selection of an asset class can be obtained and used to obtain/load a pretrained model(s) 406. Pretrained model(s) 406 can be pretrained using asset data, such as time series sensor data for example, for a set of asset classes and can be used to initialize weights and early layers of a model (e.g., neural network, LSTM model, etc.) to be trained to generate predictions of remaining useful life for an asset. In some embodiments, pretrained model(s) 406 can be generated/provided by an asset model transfer learning service 414 to provide for transfer learning such that learning from an original asset class can be applied to a related class. In some embodiments, models such as pretrained model(s) 406 can be provided by and/or through an asset model marketplace 426.

A model (e.g., neural network model, LSTM model, etc.) such as LSTM model 408 can be initialized and trained, for example, based on a pretrained model 406, asset data (e.g., preprocessed data from data preprocessing 404, etc.), and/or the like, to provide predictions/estimations of remaining useful life associated with one or more assets (e.g., asset 420a—Asset (A), etc.). The trained model (e.g., neural network, LSTM, etc.) such as neural network 410 can be provided as output resulting from model training operations, such as described herein. Neural network 410 (e.g., trained model, LSTM neural network, etc.) can be deployed in production to generate remaining useful life data 412 for use by the predictive maintenance system 402. In some embodiments, remaining useful life data 412 can be provided from predictive maintenance system 402 to enterprise asset management 428 for use in managing one or more assets. In some embodiments, enterprise asset management 428 can include procurement management services 430, inventory management services 432, work management services 434, and work scheduling services 436 which can assist in the management of assets.

Figure 5:
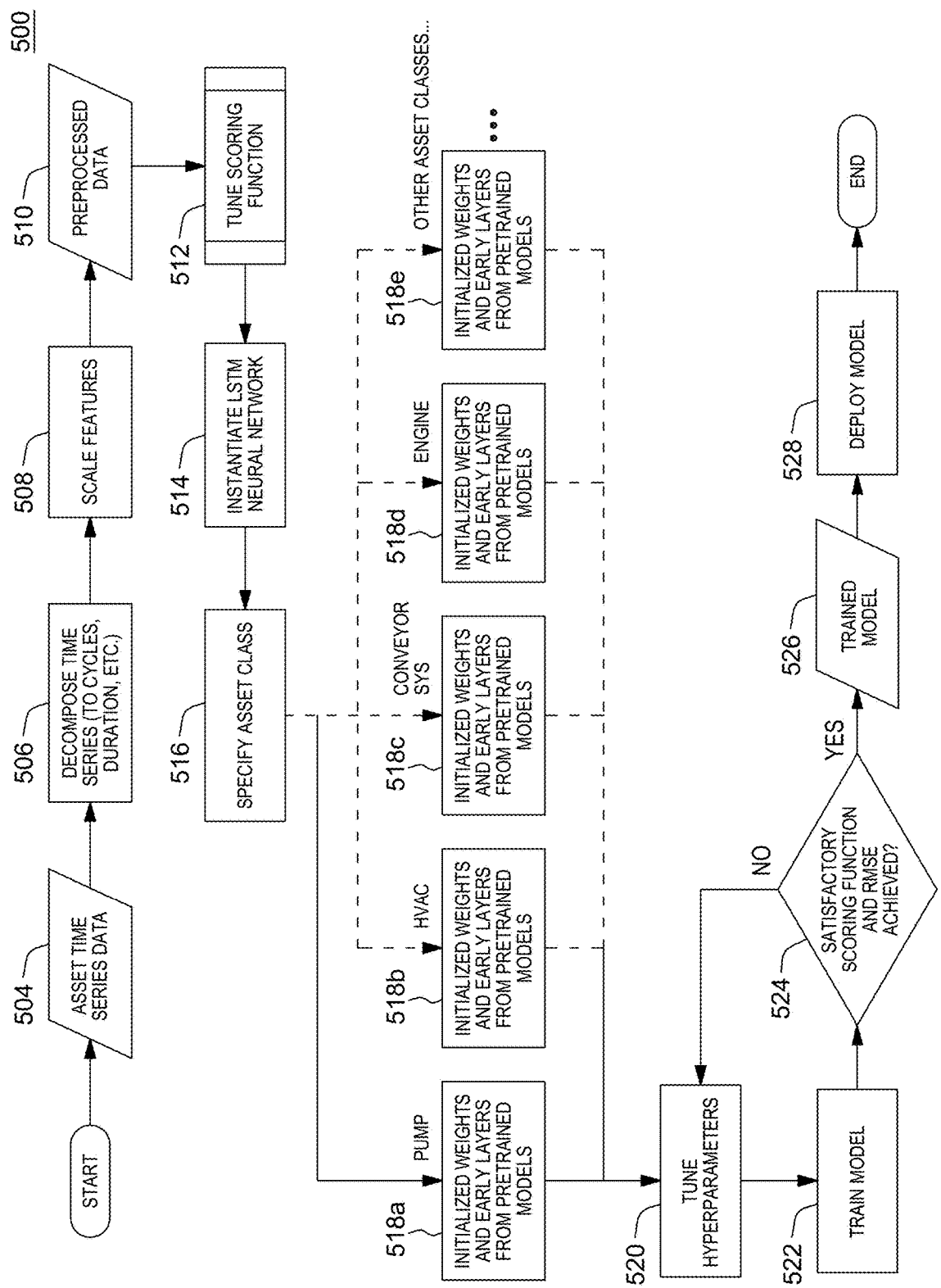
FIG. 5 depicts a block diagram of an example workflow to train models for use in predicting remaining useful life of assets, according to embodiments of the present invention.

FIG. 5 depicts a block diagram of an example workflow 500 to train models for use in predicting remaining useful life of assets, according to embodiments of the present invention. As illustrated in FIG. 5, operations included in workflow 500 begin at input block 504 where asset time series data for asset(s) to be analyzed (e.g., in a predictive maintenance system, for remaining useful life prediction, etc.) is obtained/acquired. In some embodiments, the asset time series data can be provided for preprocessing. The preprocessing can include, for example, decomposing time series data into chronological cycles, duration of operation, and/or the like at an initial preprocessing block 506. The preprocessing can also include selecting and scaling features that are pertinent for the estimation/prediction of remaining useful life at a subsequent preprocessing block 508. The preprocessed data 510 can be provided for use in training model(s) (e.g., remaining useful life prediction models, predictive maintenance models, etc.) and/or generating remaining useful life prediction data for one or more assets. A scoring function can be tuned at tuning block 512, for example based on criticality of prediction, priority of asset, and/or the like, such that the scoring function can be used in weighting parameters (e.g., hyperparameters, etc.) of a neural network (e.g., LSTM neural network, etc.).

A neural network (e.g., LSTM neural network, etc.) can be instantiated at insatiate block 514 such that the neural network (e.g., LSTM neural network, etc.) can be trained and optimized to provide remaining life prediction data. An asset class associated with the asset(s) to be analyzed can be obtained at asset class block 516. The asset class specified at asset class block 516 can be used to obtain and/or load a pretrained model, such as pretrained models 518a through 518e. Pretrained models 518a-518e can each be pretrained for an asset class (e.g., based on time series sensor data for a set of asset classes, etc.) and be used to initialize a model (e.g., neural network, LSTM model, LSTM network, etc.) that is to be trained to generate remaining useful life prediction data. For example, a pretrained model 518a may be pretrained for a pump asset class, a pretrained model 518b may be pretrained for a HVAC asset class, a pretrained model 518c may be pretrained for a conveyor asset class, a pretrained model 518d may be pretrained for an engine asset class, a pretrained model 518e may be pretrained for another asset class, and so on. As illustrated in FIG. 5, a pump asset class is specified and as such pretrained model 518a is obtained and/or loaded for initializing weights and layers of the model (e.g., neural network, LSTM model, LSTM network, etc.).

After initialization of model weights and early layers, based on pretrained model 518a, the model hyperparameters can be tuned at hyperparameter tuning block 520, for example, to optimize an error metric, such as RMSE and/or the like. In some embodiments, a genetic algorithm can be applied to the model e.g., neural network, LSTM model, LSTM network, etc.) at hyperparameter tuning block 520. In some embodiments, the hyperparameters can be weighted using a scoring function, for example to penalize overestimation of remaining useful life. The model can be trained iteratively at training block 522. At decision block 524, a determination can be made whether the current training iteration results in a satisfactory scoring function and a satisfactory error metric. If at decision block 524, a determination is made that the current the scoring function and error metric are not satisfactory, the workflow 500 returns to hyperparameter tuning block 520 for a next training iteration. If at decision block 524, a determination is made that the current the scoring function and error metric are satisfactory, the workflow 500 continues and trained model 526 is provided. The trained model can then be deployed to production at deployment block 528 and the trained model can be used in generating asset remaining useful life prediction data that can be used to assist in managing one or more assets. Workflow 500 then ends.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
obtaining asset data;
determining an asset class associated with the asset data;
initializing a new neural network model based, at least in part, on a pretrained model associated with the asset class, wherein the new neural network model and the pretrained model are different models that are not the same;
training the new neural network model based, at least in part, on the asset data to obtain a trained remaining useful life model;
tuning a scoring function based on a remaining useful life prediction for the one or more assets and a priority of the one or more assets, wherein the scoring function penalizes for over-estimation of remaining useful life for the one or more assets; and
deploying the trained remaining useful life model to generate prediction data for one or more assets as output of the trained remaining useful life model, wherein the prediction data is outputted by the trained remaining useful life model for generating a work order for preventative maintenance schedule by an enterprise asset management system.

2. The computer-implemented method of claim 1, further comprising:
preprocesssing the asset data obtained, wherein preprocessing the asset data includes:
decomposing time series data included in the asset data in terms of chronological cycles and duration of operation, wherein the time series data is associated with an asset;
obtaining age data associated with the asset;
generating a factor representing asset degradation based, at least in part, on the age data associated with the asset;
obtaining one or more features associated with the asset;
scaling the one or more features associated with the asset that the time series data is associated with; and
transforming a feature set to a two-dimension tensor, wherein the feature set includes the one or more scaled features of the one or more features associated with the asset that the time series data is associated with.

3. The computer-implemented method of claim 1, further comprising tuning the scoring function based on a remaining useful life prediction for the one or more assets and a priority of the one or more assets using a weighting function where an increased penalty is given for lower remaining useful life time frames and higher priority assets.

4. The computer-implemented method of claim 1, wherein training the new neural network model to obtain the trained remaining useful life model includes:
tuning hyperparameters associated with the new neural network model weighted using the scoring function, wherein the tuning optimizes an error metric, wherein the error metric includes a measure of a prediction error for a defined critical period associated with asset remaining useful life that is less than a specified amount of time;
determining that the scoring function and the error metric meet one or more conditions; and
providing the trained remaining useful life model as output in response to determining that the scoring function and the error metric meet the one or more conditions.

5. The computer-implemented method of claim 1, wherein the new neural network model is a long short-term memory neural network model.

6. The computer-implemented method of claim 1, wherein the asset data includes time series data associated with a set of assets to be analyzed, and further comprises training the pretrained model using the time series data, wherein training the new network model based, in part, on the asset data comprises training the new neural network model using the time series data.

7. The computer-implemented method of claim 1, wherein a plurality of pretrained models, including the pretrained model associated with the asset class, are pretrained using training data which includes time series data for a set of asset classes,
wherein initializing the new neural network model based, at least in part, on the pretrained model associated with the asset class comprises initializing one or more weights and one or more layers of the new neural network model based, at least in part, on the pretrained model associated with the asset class.

8. A computer program product comprising a computer readable storage medium having stored thereon:
program instructions programmed to obtain asset data;
program instructions programmed to determine an asset class associated with the asset data;
program instructions programmed to initialize a new neural network model, wherein the new neural network model is initialized based on a pretrained model associated with the asset class, wherein the new neural network model and the pretrained model are different models that are not the same;
program instructions programmed to train the new neural network model based, at least in part, on the asset data to obtain a trained remaining useful life model;
program instructions programmed to tune a scoring function based on a remaining useful life prediction for the one or more assets and a priority of the one or more assets, wherein the scoring function penalizes for over-estimation of remaining useful life for the one or more assets; and
program instructions programmed to deploy the trained remaining useful life model to generate prediction data for one or more assets as output of the trained remaining useful life model, wherein the prediction data is outputted by the trained remaining useful life model for generating a work order for preventative maintenance schedule by an enterprise asset management system.

9. The computer program product of claim 8, the computer readable storage medium having further stored thereon:
program instructions programmed to preprocesss the asset data obtained, wherein preprocessing the asset data includes:
decomposing time series data included in the asset data in terms of chronological cycles and duration of operation, wherein the time series data is associated with an asset;
obtaining age data associated with the asset;
generating a factor representing asset degradation based, at least in part, on the age data associated with the asset;
obtaining one or more features associated with the asset;
scaling the one or more features associated with the asset that the time series data is associated with; and
transforming a feature set to a two-dimension tensor, wherein the feature set includes the one or more scaled features of the one or more features associated with the asset that the time series data is associated with.

10. The computer program product of claim 8, the computer readable storage medium having further stored thereon:
program instructions programmed to tune the scoring function based on a remaining useful life prediction for the one or more assets and a priority of the one or more assets using a weighting function where an increased penalty is given for lower remaining useful life time frames and higher priority assets.

11. The computer program product of claim 8, wherein training the new neural network model to obtain the trained remaining useful life model includes:
tuning hyperparameters associated with the new neural network model weighted using the scoring function, wherein the tuning optimizes an error metric, wherein the error metric includes a measure of a prediction error for a defined critical period associated with asset remaining useful life that is less than a specified amount of time;
determining that the scoring function and the error metric meet one or more conditions; and
providing the trained remaining useful life model as output in response to determining that the scoring function and the error metric meet the one or more conditions.

12. The computer program product of claim 8, wherein initializing the new neural network model based, at least in part, on the pretrained model associated with the asset class includes initializing one or more weights and one or more layers of the new neural network model based, at least in part, on the pretrained model associated with the asset class.

13. A computer system comprising:
a processor set; and
a computer readable storage medium;
wherein:
the processor set is structured, located, connected and programmed to run program instructions stored on the computer readable storage medium; and
the stored program instructions include:
program instructions programmed to obtain asset data;
program instructions programmed to determine an asset class associated with the asset data;
program instructions programmed to initialize a new neural network model, wherein the new neural network model is initialized based on a pretrained model associated with the asset class, wherein the new neural network model and the pretrained model are different models that are not the same;
program instructions programmed to train the new neural network model based, at least in part, on the asset data to obtain a trained remaining useful life model;
program instructions programmed to tune a scoring function based on a remaining useful life prediction for the one or more assets and a priority of the one or more assets, wherein the scoring function penalizes for over-estimation of remaining useful life for the one or more assets; and
program instructions programmed to deploy the trained remaining useful life model to generate prediction data for one or more assets as output of the trained remaining useful life model, wherein the prediction data is outputted by the trained remaining useful life model for generating a work order for preventative maintenance schedule by an enterprise asset management system.

14. The computer system of claim 13, wherein the stored program instructions further include:
program instructions programmed to preprocesss the asset data obtained, wherein preprocessing the asset data includes:
decomposing time series data included in the asset data in terms of chronological cycles and duration of operation, wherein the time series data is associated with an asset;
obtaining age data associated with the asset;
generating a factor representing asset degradation based, at least in part, on the age data associated with the asset;
obtaining one or more features associated with the asset;
scaling the one or more features associated with the asset that the time series data is associated with; and
transforming a feature set to a two-dimension tensor, wherein the feature set includes the one or more scaled features of the one or more features associated with the asset that the time series data is associated with.

15. The computer system of claim 13, wherein training the new neural network model to obtain the trained remaining useful life model includes:
tuning hyperparameters associated with the new neural network model weighted using the scoring function, wherein the scoring function penalizes for over-estimation of remaining useful life for critical assets, wherein the tuning optimizes an error metric, and wherein the error metric includes a measure of a prediction error for a defined critical period associated with asset remaining useful life;
determining that the scoring function and the error metric meet one or more conditions; and
providing the trained remaining useful life model as output in response to determining that the scoring function and the error metric meet the one or more conditions.

16. The computer system of claim 13, wherein the asset data includes time series data associated with a set of assets to be analyzed, and wherein the stored program instructions further include:
   program instructions programmed to train the pretrained model using the time series data, wherein training the new network model based, in part, on the asset data comprises training the new neural network model using the time series data.

17. The computer system of claim 13, wherein initializing the new neural network model based, at least in part, on the pretrained model associated with the asset class includes initializing one or more weights and one or more layers of the new neural network model based, at least in part, on the pretrained model associated with the asset class.

\* \* \* \* \*